July 16, 1963 W. H. SCOTT 3,098,138
THERMAL CONTROL APPARATUS
Filed Dec. 10, 1959
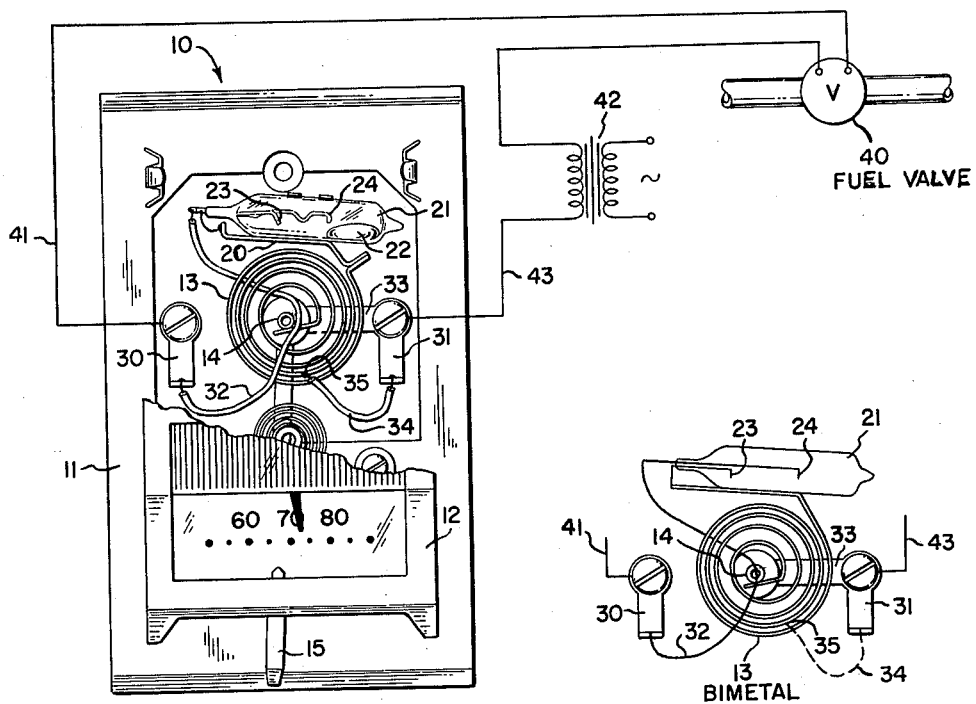
*Fig-1*  *Fig-2*
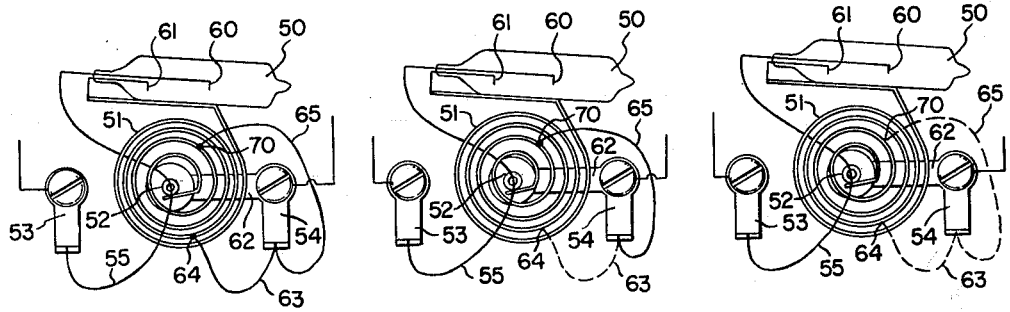
*Fig-3*  *Fig-4*  *Fig-5*
INVENTOR.
WARREN H. SCOTT
BY
*Clyde C. Blinn*
ATTORNEY United States Patent Office 3,098,138
Patented July 16, 1963

3,098,138
THERMAL CONTROL APPARATUS
Warren H. Scott, Bloomington, Minn., assignor to Minneapolis-Honeywell Regulator Company, Minneapolis, Minn., a corporation of Delaware
Filed Dec. 10, 1959, Ser. No. 858,735
4 Claims. (Cl. 200—122)

The present invention is concerned with an improved condition responsive device; in particular, the invention concerns a thermostat which has an improved means of obtaining various levels of "heat anticipation" depending upon the particular load the thermostat is to control.

Since the advent of "heat anticipation" in thermostats, various ways have been devised for anticipating the conditioning load to provide satisfactory control. In early thermostats, the heat developed by the thermostat switch when the circuit was closed would artificially heat the thermostat to satisfy the thermostat before the actual room temperature reached the selected value. The artificial heating of the thermostat prevented the commonly undesired "overshooting" of the control point. In some thermostats, the load current passes through the switch and the temperature responsive means or bimetal. The heat developed by the current passing through the bimetal artificially heats the thermostat to improve the thermostat action and maintain the temperature of the space being controlled closer to the actual selected control point.

In the thermostat industry, a particular thermostat is generally manufactured for use with various size loads. Whether the thermostat is controlling a gas valve, an oil valve, or some other type of load makes no difference as far as the switching action is concerned; however, the artificial heating effect in the thermostat whether it be produced by the switch, the bimetal, or some other resistance heater, must be matched to the particular current drawn by the load. For this reason, a thermostat is generally provided with an adjustable heater to select the amount of artificial heat to the thermostat. Such an adjustable heater might be a rheostat contained in the thermostat and connected in the load circuit to provide various levels of artificial heat to the thermostat. A fixed resistance unit can be replaced by resistance units having different values depending upon the amount of artificial heat needed. In such cases, the thermostat is sold by the manufacturer, and when the thermostat is installed in the particular installation, the proper resistance is placed in the thermostat or the potentiometer is adjusted to match the particular load. If each thermostat has its own artificial resistance heater, a very large inventory of different thermostats is required to always have a thermostat available for a particular load. Rather than make these individual thermostats, an adjustable heater or various types of resistance heaters which can be interchanged are provided at an expense to the ultimate customer.

The present invention came about by recognizing the need for a thermostat which could be readily matched to a load during the installation of the thermostat in the field, and yet, the cost of the thermostat for obtaining the selective heat anticipation level was maintained at a minimum. The present thermostat has a plurality of parallel circuits which shunt various portions of the bimetal. When all of the circuits are left in place, the load current passes through a small portion of the bimetal. With a large load current, the amount of artificial heat is maintained within certain limits. If the load current is much less and more of the bimetal must be placed in the circuit to obtain a desired amount of artificial heating, one of the wires forming a parallel, shunt circuit can be snipped out in the field to adjust the thermostat to the particular load. Such a thermostat design not only provides a thermostat which is readily adjusted to a particular load at the place of installation, but the cost of providing the various levels of artificial heating available to match various loads is greatly reduced over thermostats presently available.

An object of the present invention is to provide an improved condition responsive device.

Another object of the present invention is to provide a temperature responsive control device having an improved means of selecting various levels of heat anticipation.

Another object of the present invention is to provide a thermostat having a bimetal temperature responsive means in which various portions of the bimetal can be selectively placed in the control circuit to obtain different values of resistance for artificial heating purposes.

These and other objects of the present invention will become apparent upon the study of the following specification and drawings of which:

FIGURE 1 is a schematic view of a thermostat connected to control a typical load.

FIGURE 2 is a pictorial showing of the circuit of the thermostat of FIGURE 1 with one wire disconnected to obtain a different circuit through the bimetal.

FIGURE 3 is another embodiment of the present invention showing a bimetal for a thermostat such as FIGURE 1 with three parallel circuits including portions of the bimetal.

FIGURE 4 shows the bimetal and circuit of FIGURE 3 with one of the parallel circuits disconnected to obtain a greater portion of the bimetal in the switch circuit.

FIGURE 5 is the circuit of FIGURES 3 and 4 with two of the parallel circuits disconnected; so that, all of the bimetal is connected in the switch circuit.

Referring to FIGURE 1, one particular type of condition responsive control device is shown connected to a load. A thermostat 10 has a base 11 and a cover 12. A temperature responsive means or bimetal 13 has one extremity connected to an adjustable shaft 14 mounted on the base. Shaft 14 is positioned by a lever 15 to change the control point of the thermostat. The other extremity 20 of the bimetal supports a switch 21. The switch is a conventional mercury switch having a small amount of mercury 22 which upon moving to the left can short out contacts 23 and 24. Contact 23 is electrically connected to one end of bimetal 13.

A pair of output terminals 30 and 31 which are mounted on base 11 are connected to a circuit comprising switch 21 and bimetal 13 traced as follows: from terminal 30, a wire 32, electrode 21, electrode 23, bimetal 13, pin 14, a buss strip 33, and back to terminal 31. A parallel circuit is provided by a wire 34 which is connected to terminal 31 and attached to bimetal 13 intermediate its ends at tap 35.

A load is connected to terminals 30 and 31 of the thermostat. A typical load is a fuel valve 40 which is connected by a circuit traced as follows: from terminal 30, a wire 41, a valve 40, a secondary of a transformer 42, a wire 43, and back to terminal 31 of the thermostat. Upon a change in the temperature of the space containing thermostat 10, bimetal 13 will change the position of the mercury switch 21 to either break or make the circuit between electrodes 23 and 24 depending upon the particular design of the bimetal 13. Assuming that the bimetal is designed for a heating thermostat, upon a drop in the space temperature, switch 21 moves to the left and mercury 22 moves to short electrodes 23 and 24.

With the particular circuit shown in FIGURE 1, the path of the current to the load or fuel valve 40 is that of the least resistance. The current would circulate from the switch electrode 23 through the bimetal 13 to the wire 34. The remaining portion of the bimetal connected between the tap 35 and the pin 14 is shunted out. With a particular current, the I²R heating effect of the bimetal would produce a certain amount of artificial heat.

If the current rating of the load was such that a larger resistance was needed to produce the desired amount of artificial heat, wire 34 could be severed or snipped out at the place of installation of the thermostat to provide the circuit as shown in FIGURE 2. In FIGURE 2, the complete bimetal 13 is used as the artificial heating means since the current must pass from the electrode 23 to post 14 as wire 34 has been taken out.

The advantages of the present invention should not be overlooked. The thermostat of FIGURE 1 has a novel means of changing the amount of resistance used as the artificial heating means at the place of installation by only snipping out wire 34. The additional cost of adding wire 34 to the thermostat is very small as compared to the previous methods of obtaining adjustable heaters such as a range of available carbon buttons or an expensive potentiometer connected in the circuit. Where the cost of the thermostat to the ultimate consumer is quite important in the competitive field, to reduce the cost of the thermostat as shown in FIGURE 1 over previous thermostats and to still provide the selective heater for heat anticipation purposes are quite important.

Another embodiment of the present invention is shown in FIGURE 3. A mercury switch 50 is supported by a bimetal 51 which has one extremity attached to a pin 52. A circuit between terminals 53 and 54 comprising switch 50 and bimetal 51 is traced as follows: from terminal 53, a wire 55, an electrode 60, an electrode 61, bimetal 51, pin 52, a buss 62, and back to terminal 54. A plurality of shunt circuits are also provided. A first circuit comprises a wire 63 which is connected between terminal 54 and a tap 64 on bimetal 51. A second circuit comprises a wire 65, which is connected between terminal 54 and a second tap 70 on bimetal 51.

When a thermostat having a bimetal and switch as shown in FIGURE 3 is connected to a load, the amount of resistance in the artificial heater made up of bimetal 51 can be selected. As shown the portion of bimetal 51 between electrode 61 and tap 64 carries the load current.

If a greater amount of resistance was needed in the artificial heating circuit, the amount of bimetal 51 contained in the circuit between terminals 53 and 54 is increased by disconnecting wire 63 as shown in FIGURE 4. The portion of the bimetal between electrode 61 and tap 70 is now contained in the circuit between terminals 53 and 54.

If even a greater amount of resistance is needed in the artificial heating circuit, the complete bimetal 51 is placed in the circuit between terminals 53 and 54 by disconnecting both wires 63 and 65 as shown in FIGURE 5.

Wires 63 and 65 could be color coded in some manner to provide easy identification. With proper instructions an installer would know which wire to cut out to match the thermostat to the controlled load.

While the invention has been disclosed as associated with one particular condition responsive control device, the intention is to limit the scope of the present invention only by the appended claims in which I claim:

1. In a thermostat, a base, a spiral bimetal, a switch adapted to control the operation of a load device, means connecting one end of said bimetal to said base, means connecting said switch to a free end of said bimetal thereby said switch is actuated as said bimetal is exposed to a changing temperature, at least two heat anticipation circuits formed when said switch is connected to the load device, a first circuit comprising said bimetal whereby when said first circuit is used current passes through the complete length of said bimetal to produce a first level of heat to heat said bimetal, a second lower resistance circuit comprising a low resistance wire connected to said bimetal intermediate its extremities to short out a portion of said bimetal whereby when said second circuit is used a second level of heat to heat said bimetal is obtained, said second circuit being adapted to be cut to select the resistance used as a heater for said bimetal with the load device at the time the load device is connected to be controlled by said switch.

2. In a thermostat having a selective heat anticipation, a base, a spiral bimetal, a switch adapted to control the operation of a load device, means connecting one end of said bimetal to said base, means connecting said switch to a free end of said bimetal thereby said switch is actuated as said bimetal changes position upon a change in temperature, at least two visually coded circuits formed when said switch is connected to the load, a first circuit comprising all of said bimetal whereby current passes through the complete length of said bimetal to produce a first level of heat for heat anticipation purposes, a second lower resistance circuit comprising a wire connected to said bimetal intermediate its extremities for shorting out a portion of said bimetal with said wire to produce a second level of heat for heat anticipation purposes, said second circuit being adapted to be disconnected to select said first or second circuit to match the heat anticipation of the thermostat to the load when the load is connected to be controlled by said switch.

3. In a thermostat having a variable heat anticipation level, a base, a spiral bimetal, a switch adapted to control the operation of a load device, means connecting one end of said bimetal to said base, means connecting said switch to a free end of said bimetal to be actuated as said bimetal is exposed to a changing temperature, a first circuit comprising said bimetal when said switch is connected to said load whereby the complete length of said bimetal is used as an electrical heater to provide heat anticipation to falsely heat said bimetal, a second parallel circuit comprising a low resistance wire connected to shunt a portion of said bimetal whereby a remaining portion of said bimetal is used as a heater for heat anticipation, said second circuit being adapted to be cut to select whether said complete bimetal or said remaining portion is used as an electrical heater.

4. In a thermostat, a base, temperature responsive bimetal having one extremity connected to said base, said bimetal having a resistance to produce heat when current flows therethrough, a switch means connecting said switch to be actuated by said bimetal when the temperature of the surrounding air changes from a first to a second predetermined value, circuit means adapted to connect said switch to control a temperature changing device, said circuit means including a plurality of circuits containing selective portions of said bimetal whereby when said switch closes upon the temperature of said bimetal reaching said second value to energize the changing device the current flows through the shortest portion of said bimetal to artificially heat said bimetal so said bimetal has a temperature of said first value, said plurality of circuits being made up of several shunting wires having one end attached to said bimetal to short out a portion of said bimetal so that more of said bimetal can be placed in said circuit by selectively cutting one or more of said wires.

References Cited in the file of this patent
UNITED STATES PATENTS

| | | |
|---|---|---|
| 1,146,637 | Massa | July 13, 1915 |
| 1,809,293 | Claytor | June 9, 1931 |
| 1,829,067 | Shryock et al. | Oct. 27, 1931 |
| 2,027,238 | Lindstrom | Jan. 7, 1936 |
| 2,228,522 | Johnson | Jan. 14, 1941 |
| 2,905,790 | Markham | Sept. 22, 1959 |

FOREIGN PATENTS

| | | |
|---|---|---|
| 206,386 | Great Britain | Nov. 8, 1923 |
| 1,189,036 | France | Mar. 16, 1959 |